(12) United States Patent
Tache et al.

(10) Patent No.: US 8,556,342 B2
(45) Date of Patent: Oct. 15, 2013

(54) HEADREST WIRE HARNESS ROUTING GUIDE ASSEMBLY

(75) Inventors: Oscar Tache, Wixom, MI (US); Ryuji Matsumura, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 371 days.

(21) Appl. No.: 12/978,052

(22) Filed: Dec. 23, 2010

(65) Prior Publication Data

US 2012/0161481 A1      Jun. 28, 2012

(51) Int. Cl.
A47C 7/62        (2006.01)
A47C 7/36        (2006.01)

(52) U.S. Cl.
USPC .......................... 297/217.3; 297/410

(58) Field of Classification Search
USPC ..................... 297/217.4, 217.3, 410
See application file for complete search history.

(56) References Cited

U.S. PATENT DOCUMENTS

| | | | |
|---|---|---|---|
| 4,545,618 A * | 10/1985 | Kitamura | 297/410 |
| 5,080,437 A | 1/1992 | Pesta et al. | |
| 5,228,183 A * | 7/1993 | Saeki | 29/527.3 |
| 6,074,011 A | 6/2000 | Ptak et al. | |
| 6,742,846 B1 | 6/2004 | Isaacson | |
| 7,416,439 B2 | 8/2008 | Macholz | |
| 7,448,679 B2 | 11/2008 | Chang | |
| 7,533,452 B1 | 5/2009 | Espina et al. | |
| 7,591,508 B2 | 9/2009 | Chang | |
| 7,636,930 B2 | 12/2009 | Chang | |
| 7,637,565 B2 | 12/2009 | Kuno et al. | |
| 7,758,117 B2 | 7/2010 | Chang | |
| 7,762,627 B2 | 7/2010 | Chang | |
| 7,812,784 B2 | 10/2010 | Chang | |
| 7,909,396 B2 * | 3/2011 | Vitito | 297/217.3 |
| 8,348,338 B2 * | 1/2013 | Galecka et al. | 297/216.12 |
| 2003/0111889 A1 | 6/2003 | Meshke et al. | |
| 2003/0222491 A1 | 12/2003 | Isaacson | |
| 2003/0226148 A1 * | 12/2003 | Ferguson | 725/75 |
| 2005/0099042 A1 | 5/2005 | Vitito | |
| 2010/0164272 A1 * | 7/2010 | Oota et al. | 297/410 |

FOREIGN PATENT DOCUMENTS

| | | |
|---|---|---|
| WO | 9947381 | 9/1999 |
| WO | 2007108271 | 9/2007 |

* cited by examiner

*Primary Examiner* — Milton Nelson, Jr.
(74) *Attorney, Agent, or Firm* — Young, Basile, Hanlon & MacFarlane, P.C.

(57) ABSTRACT

A wire harness guide for routing a wire harness through a seat back of a vehicle seat includes a guide tube and an attachment member. The guide tube has a first end that defines a first opening, and a second end that is spaced apart from the first end and defines a second opening. A guide passage extends through the guide tube from the first opening to the second opening, and the wire harness enters the guide passage at the first opening and exits the guide passage at the second opening. The attachment member is connected to the guide tube and is connectable to the seat back.

25 Claims, 19 Drawing Sheets

HEADREST WIRE HARNESS ROUTING GUIDE ASSEMBLY

FIELD OF THE INVENTION

The invention relates to the field of wire harnesses for motor vehicles, and more particularly, to a guide assembly for routing a headrest wire harness.

BACKGROUND OF THE INVENTION

In passenger vehicles, it has become commonplace to install electrical components within the headrests of the vehicle seats. By way of example, electrical components such as motorized assemblies for changing the position of the headrest or audio/visual displays may be installed in the headrest. Thus, automobile designers have been tasked with providing an electrical connection between the headrest and the electrical system of the vehicle. This is typically accomplished by routing a headrest wire harness through the seat to which the headrest is attached.

Occasionally, it is necessary to replace or newly install a headrest wire harness after final assembly of a motor vehicle. It is difficult, however, to access the interior of the vehicle seat in order to route a headrest wire harness through the vehicle seat. This is typically because the internal parts of the vehicle seat, including a frame and cushions, are held under compression by the seat cover of the vehicle seat. Thus, in many cases, there is no easy way to remove and reinstall the seat cover of the vehicle seat.

In light of the foregoing, need remains for a structure that is capable of routing a wire harness through a vehicle seat subsequent to installation of the seat cover without disturbing the seat cover.

SUMMARY

Guides for routing a wire harness from an electronic component in a headrest through a seat back are taught herein. One wire harness guide taught herein includes a guide tube and an attachment member. The guide tube has a first end that defines a first opening, and a second end that is spaced apart from the first end and defines a second opening. A guide passage extends through the guide tube from the first opening to the second opening, and the wire harness enters the guide passage at the first opening and exits the guide passage at the second opening. The attachment member is connected to the guide tube and is connectable to the seat back.

Vehicle seat assemblies incorporating wire harness guides are also taught herein. One vehicle seat assembly includes a frame member, and a seat back that is supported by the frame member. The seat back has a top end, a bottom end, and an exit aperture. A headrest rod that supports the headrest having an electrical component disposed therein. A first end of the headrest rod is disposed within the headrest, and a second end of the headrest rod is disposed outside the headrest and is receivable within the seat back at the top end of the seat back. The vehicle seat assembly also includes a harness guide having a guide tube and an attachment member that is connected to the guide tube and to the seat back. The guide tube has a first end defining a first opening, and a second end that is spaced apart from the first end and defines a second opening. A guide passage extends through the guide tube from the first opening to the second opening. A wire harness is connected to the electrical component. The wire harness enters the headrest rod at a location that is proximate to the first end of the headrest rod, exits the headrest rod at a location that is proximate to the second end of the headrest rod, and extends through the guide passage of the guide tube the to exit aperture of the seatback.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1A:
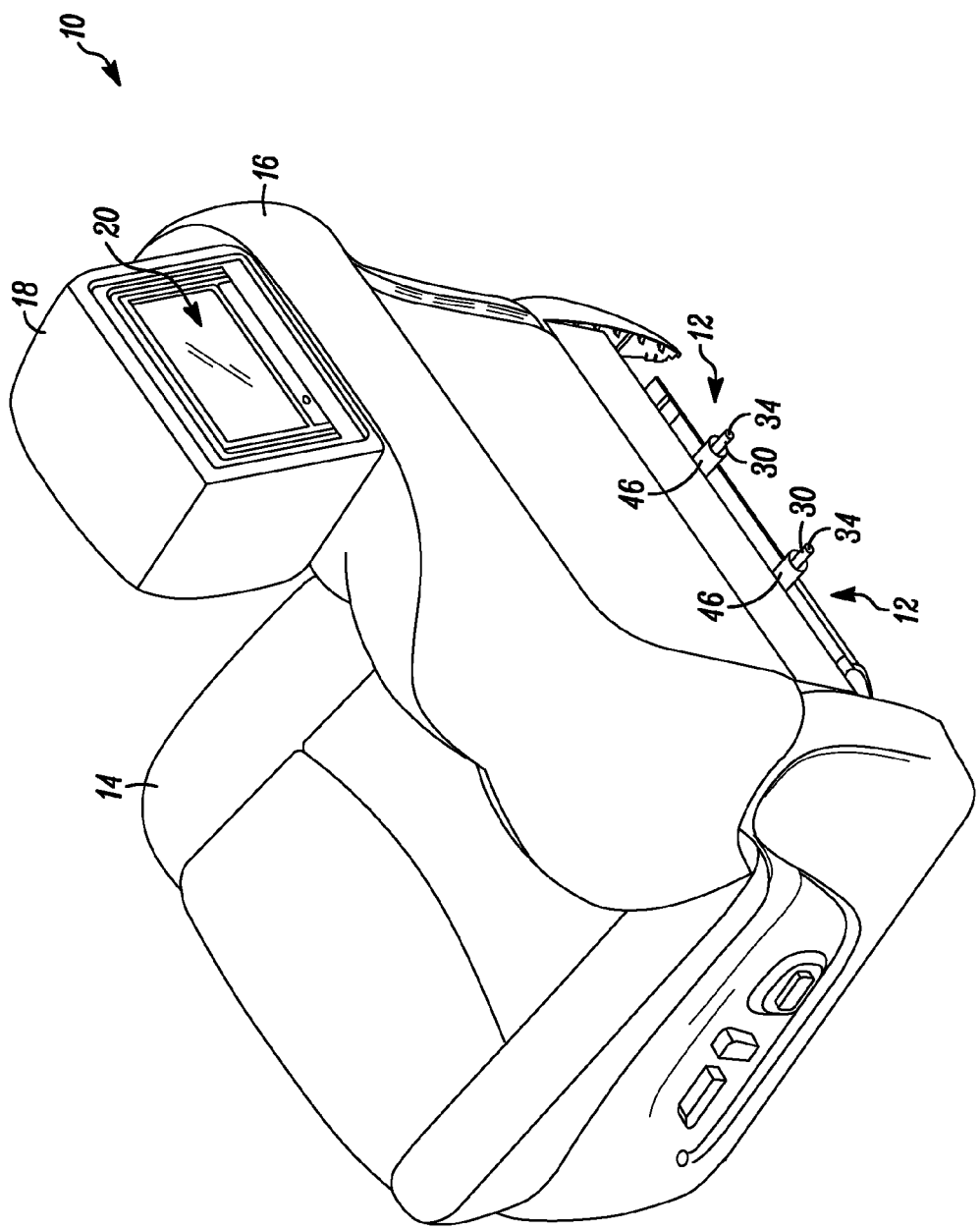
FIG. 1A is a perspective view showing a vehicle seat incorporating a headrest wire harness routing guide assembly according to the invention for routing a wire harness through the vehicle seat.
Figure 1B:
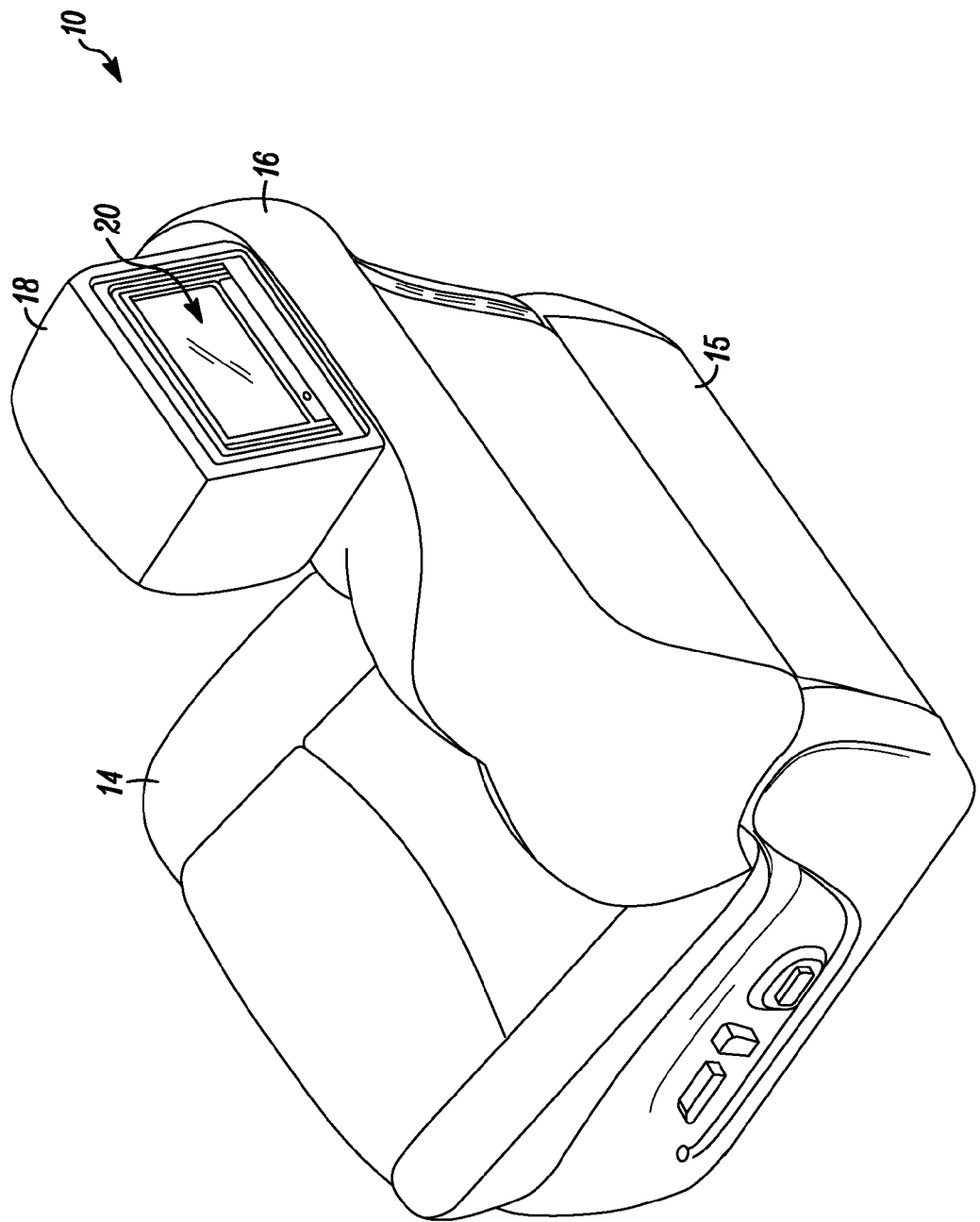
FIG. 1B is a perspective view showing the vehicle seat of FIG. 1A, wherein a toe kick plate is installed to conceal the wire harness.

FIGS. 1A-1B show a vehicle seat 10 having one or more harness guide assemblies 12 according to the invention for routing a wire harness 30 through the vehicle seat 10. The seat 10 includes a seat bottom 14 and a seat back 16. A headrest 18 is supported by the seat back 16, and an electrical component 20 is disposed within the headrest 18. The electrical component 20 may be any manner of device, including, but not limited to, an audio/visual display or an electrical motor for moving the headrest 18 with respect to the seat back 16.

Figure 2A:
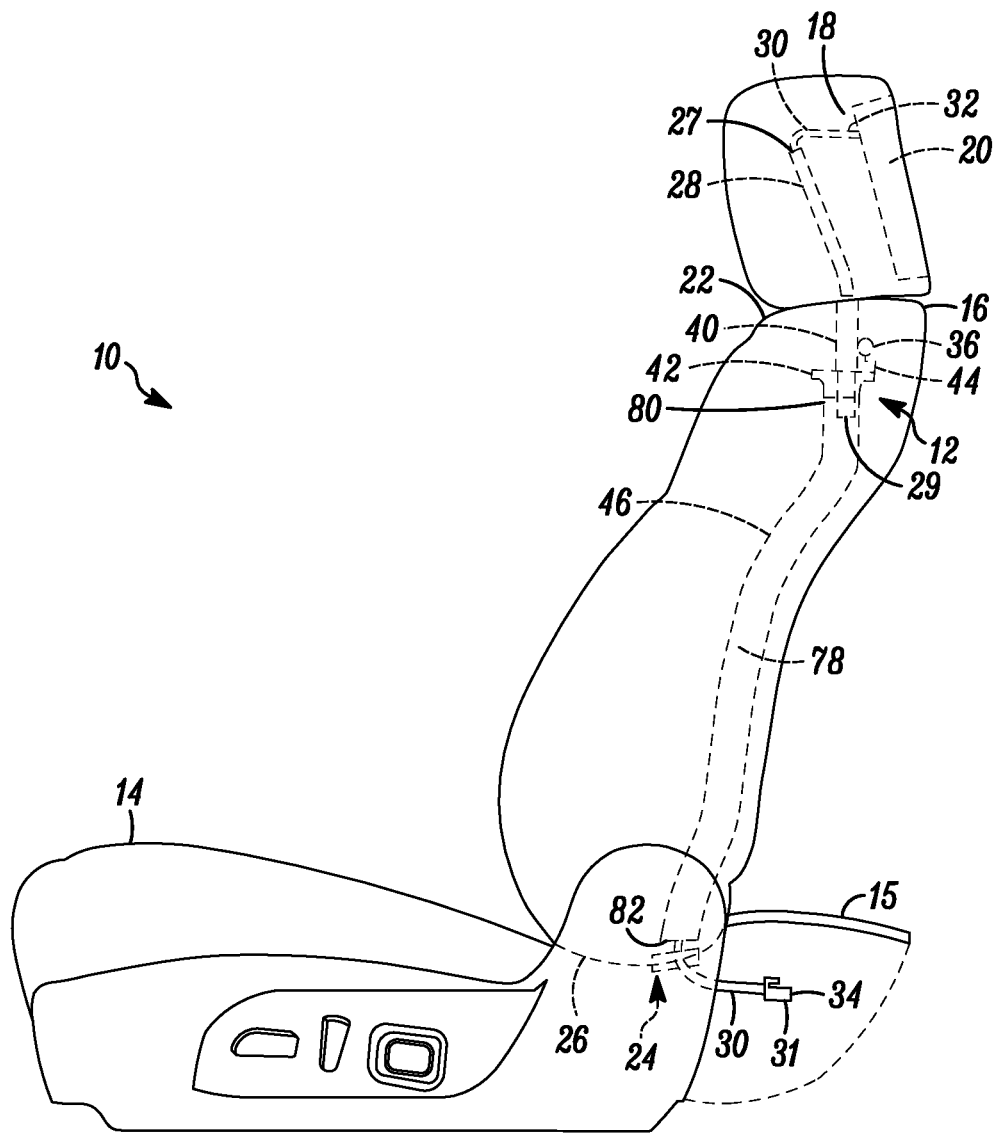
FIG. 2A is a side view of the vehicle seat of FIG. 1B, wherein the toe kick plate is in an open position and a headrest is in a retracted position.
Figure 2B:
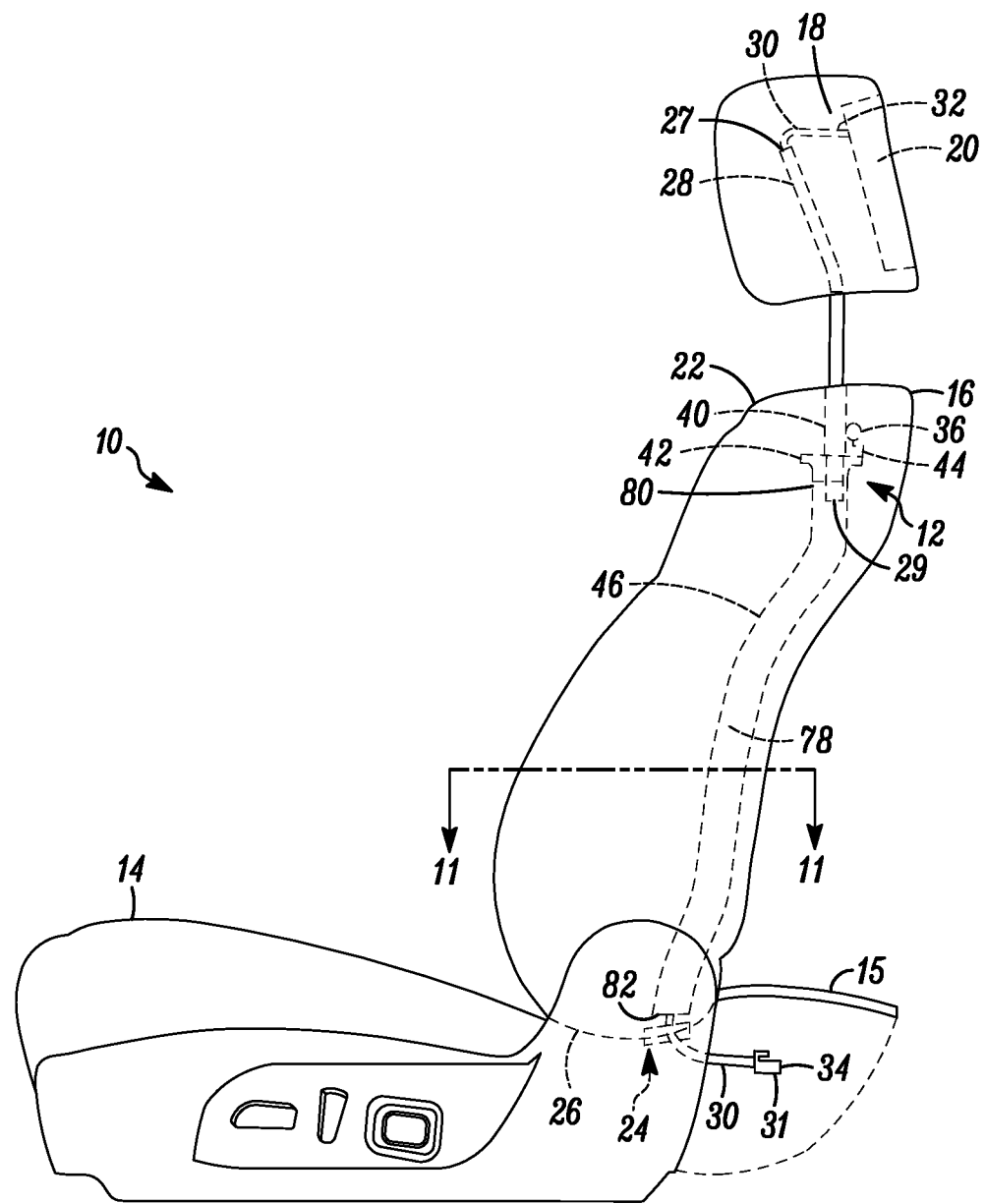
FIG. 2B is a side view of the vehicle seat of FIG. 1B, wherein the toe kick plate is in the open position and the headrest is in an extended position.

As shown in FIGS. 2A-2B, the harness guide assembly 12 extends through the seat back 16. In particular, the headrest 18 includes a headrest rod 28 that is received by the seat back 16 at a top end 22 thereof. The harness guide assembly 12 extends through the seat back 16 from the headrest rod 28 to an exit aperture 24 that is positioned at a bottom end 26 of the seat back 16. The wire harness 30 is disposed at least partially within the harness guide assembly 12. Thus, the wire harness 30 is routed through the seat back 16 from the headrest 18 to the exit aperture 24 by the harness guide assembly 12. As shown in FIG. 1B, a toe kick plate 15 may be installed with respect to the seat back 16 and/or the seat bottom 14 covering the bottom end 26 of the seatback, including the exit aperture 24. The toe kick plate 15 thus protects the wire harness 30 from interference by an occupant or objects within the vehicle. The toe kick plate 15 can be connected to a portion of the vehicle seat 10 using a J-hook (not shown) or other suitable structure that is configured to engage a portion of the vehicle seat 10 and be releasable with respect to the vehicle seat 10 to allow access to the wire harness 30, as shown in FIGS. 2A-2B.

The headrest 18 is supported with respect to the seat back 16 on one or more headrest rods 28, each having a hollow, tubular structure that extends from a first end 23 that is positioned within the headrest 18, to a second end 25 that is distal to the headrest 18, within the seat back 16. Each headrest rod 28 also includes a first opening 27 that is positioned within the headrest 18 and a second opening 29 that is positioned distal to the headrest 18, within the seat back 16. The first opening 27 and the second opening 29 of each headrest rod 28 can be positioned at the first end 27 and the second end 29 of the headrest rod 28, respectively, or may be positioned along the headrest rods 28 at locations that are spaced from the first end 27 and the second end 29.

The headrest rods 28 support the headrest 18 with respect to the seat back 16 such that it is moveable with respect to the seat back 16. In particular, the headrest rods 28 are connected to the seat back 16 such that the headrest rods 28 are slidably received by the seat back 16 for movement between a retracted position (FIG. 2A) and an extended position (FIG. 2B).

The wire harness 30 is provided with conventional connectors 31 and is connected to the electrical component 20 at a first end 32 of the wire harness 30 by one of the connectors 31. The connectors 31 may be received in complementary receptacles 21 that are formed on the electrical component 20 to electrically connect the wire harness 30 to the electrical component 20.

The first end 32 of the wire harness 30 is disposed within the headrest 18, where the wire harness 30 enters the first opening 27 of the headrest rod 28 and extends through the headrest rod 28, out the second opening 29 thereof, and into the seat back 16. If the size of the connectors 31 permits, the connectors 31 can be installed with respect to the wire harness 30 prior to installation of the wire harness 30 in the headrest rod 28. Otherwise, the wire harness 30 can be passed through the headrest rod 28 first via openings 27 and 29, and the connectors 31 can be installed to the first and/or second ends 32, 34 of the wire harness 30 prior to installation of the headrest 18 to the seat back 16.

A second end 34 of the wire harness 30 exits the harness guide assembly 12 at the bottom end 26 of the seat back 16 at or near the exit aperture 24. Thus, the second end 34 of the wire harness 30 extends out of the exit aperture 24 for connection to the vehicle's electrical system using one of the connectors 31, either directly or by way of an extension wire harness (not shown). The guide assembly 12 may also extend out of the exit aperture 24, or the guide assembly 12 may terminate inside the seat back 16.

Figure 3:
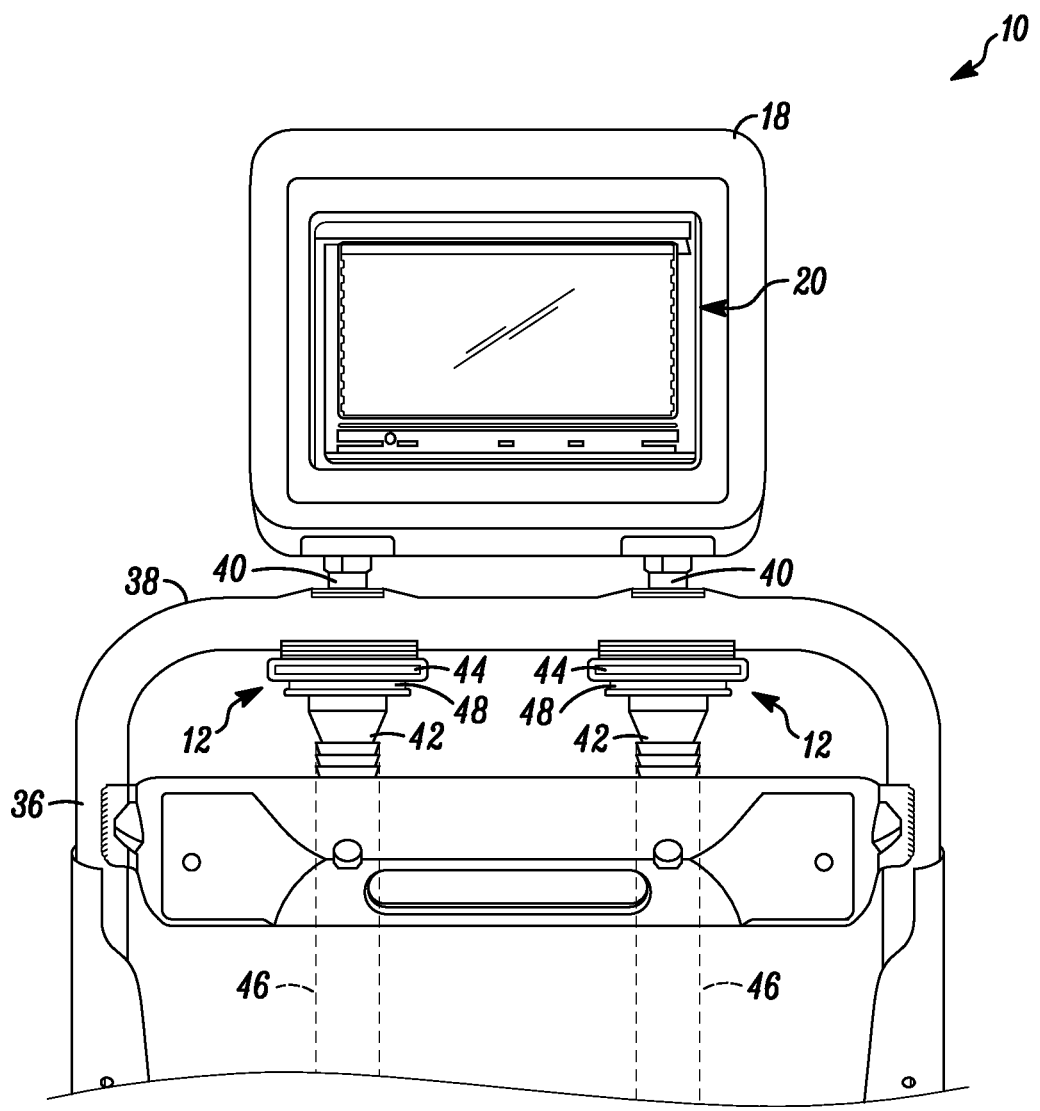
FIG. 3 is a rear view showing connection of the guide assembly with respect to a frame of the vehicle seat.
Figure 4:
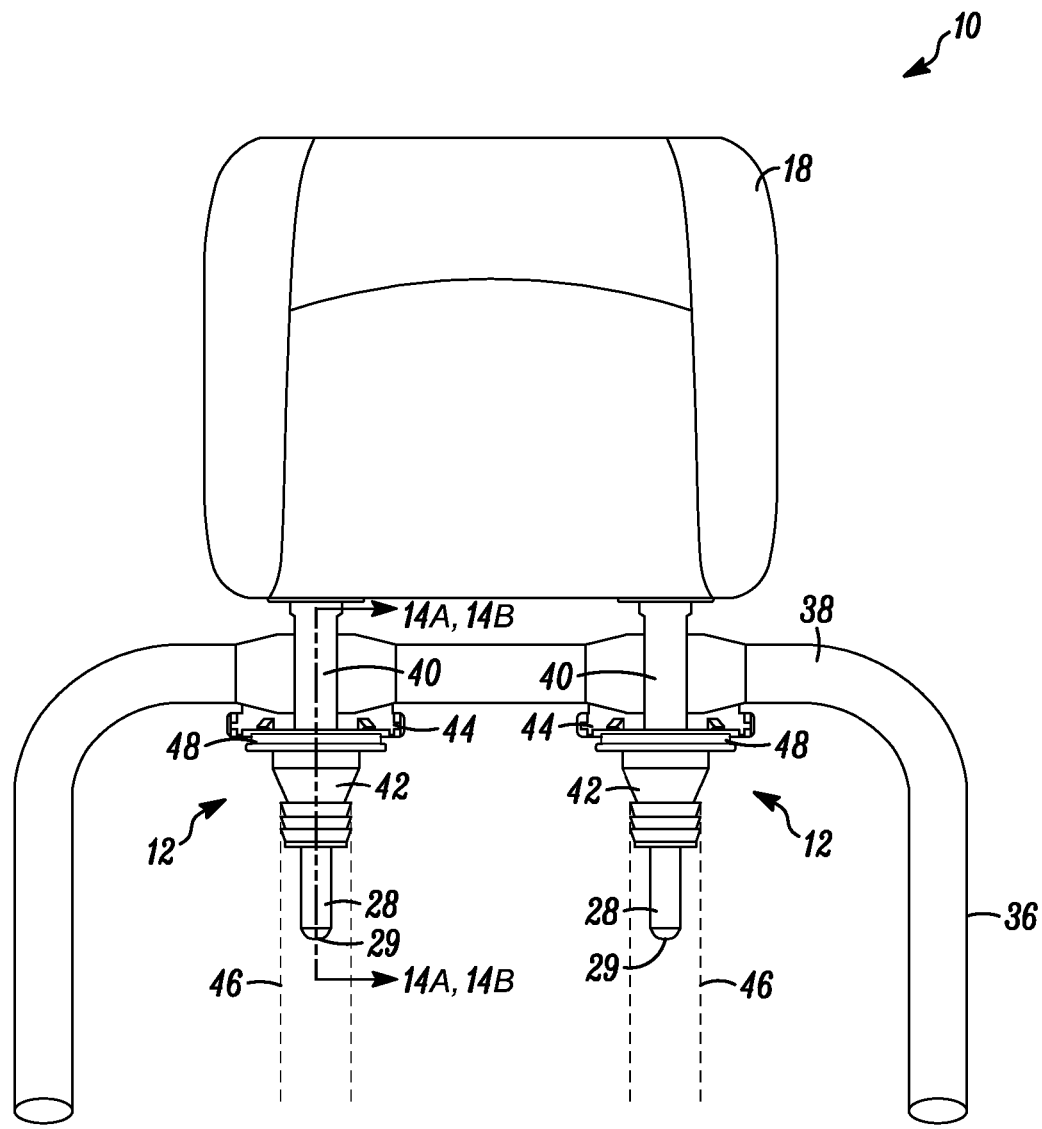
FIG. 4 is a front view showing connection of the guide assembly to the frame of the vehicle seat.
Figure 5:
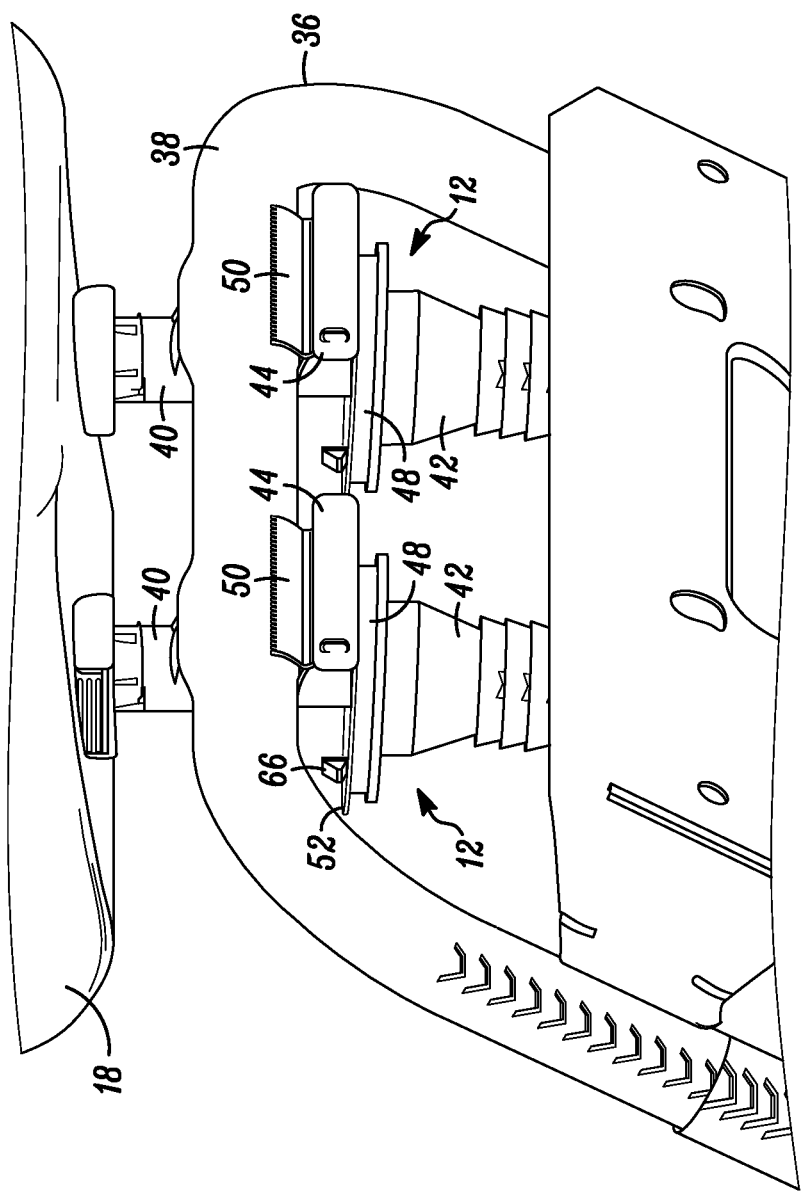
FIG. 5 is a perspective view showing connection of the guide assembly with respect to the frame of the vehicle seat.

As shown in FIGS. 3-5, the seat back 16 includes a frame 36, and the harness guide assembly 12 is supported by the frame 36 of the seat back 16. The frame 36 is typically fabricated from metal and may be tubular. A top portion 38 of the frame 36 extends generally horizontal in a lateral direction across the seat back 16. A pair of rod sleeves 40 is connected to the top portion 38 of the frame 36 such that each of the rod sleeves 40 extends generally upward from the frame 36. The rod sleeves 40 may be attached to a frontward or rearward surface of the top portion 38 of the frame 36, or, alternatively, the rod sleeves 40 may extend through the top portion 38 of the frame 36. In either case, each harness guide assembly 12 is connected to the top portion 38 of the frame 36 adjacent to respective ones of the rod sleeves 40, such as by mounting each harness guide assembly 12 to a forward surface, a rearward surface, or a lower surface of the top portion 38 of the frame 36 adjacent to the rod sleeves 40. Furthermore, the harness guide assemblies 12 may be connected to the frame 36 directly opposite the rod sleeves 40, such that the frame 36 is interposed between the rod sleeves 40 and the location at which the guide assemblies 12 are connected to the frame 36.

The harness guide assembly 12 includes a harness guide member 42, a mounting bracket 44, and a guide tube 46. The mounting bracket 44 is connected to the frame 36 of the seat back 16. The harness guide member 42 is supported by the mounting bracket 44, and the guide tube 46 is supported by the harness guide member 42. A gasket 48 may be positioned between the harness guide member 42 and the mounting bracket 44 to ensure a secure fit and to eliminate squeak and rattle noise.

Figure 6:
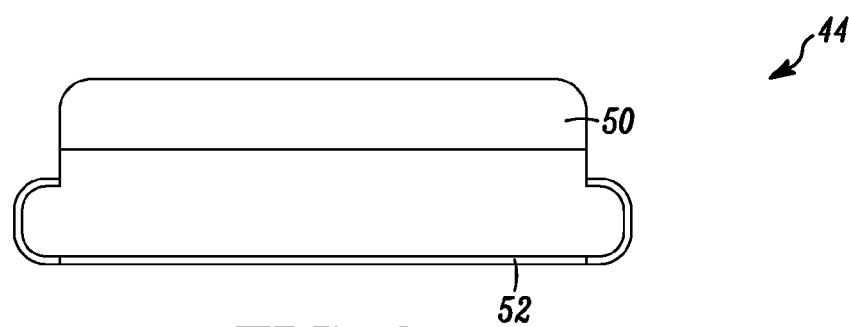
FIG. 6 is a front view showing the mounting bracket of the harness guide according to the invention.
Figure 7:
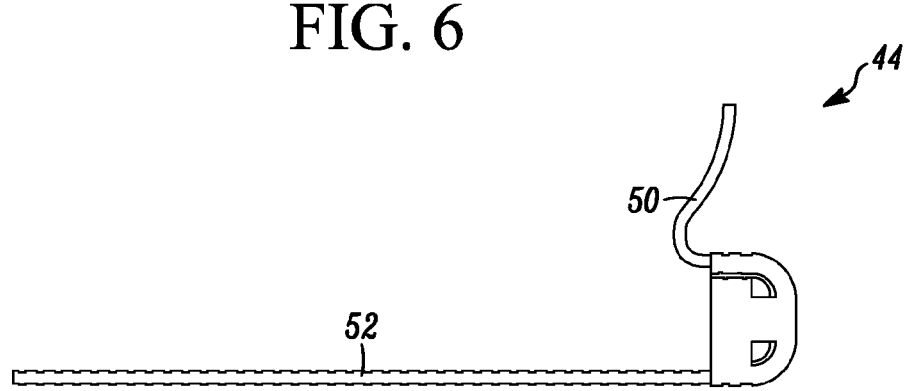
FIG. 7 is a side view showing the mounting bracket of the harness guide according to the invention.
Figure 8:
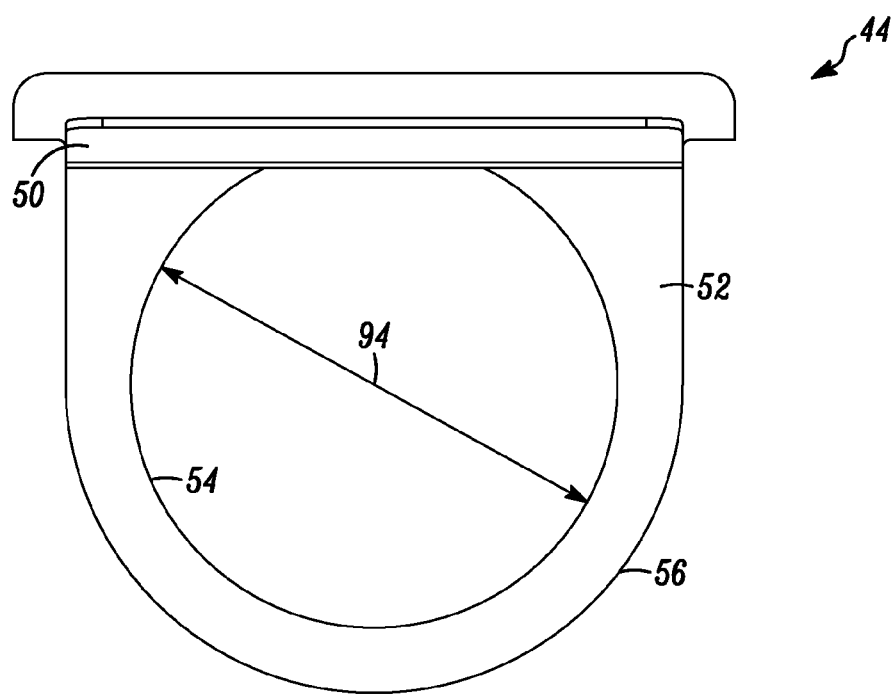
FIG. 8 is a top view showing the mounting bracket of the harness guide according to the invention.

As shown in FIGS. 6-8, the mounting bracket 44 may include an attachment portion 50 and a base portion 52 that defines a pass-through aperture 54 that extends through the base portion 52. The attachment portion 50 of the mounting bracket 44 is connectable to the seat back 16. As shown and described herein, the attachment portion 50 is rigidly connected to the top portion 38 of the frame 36 of the seat back 16. This rigid connection may be accomplished by various means, depending on the construction of the mounting bracket 44. For example, if the mounting bracket 44 is fabricated from metal, it may be connected to the frame 36 of the seat back 16 by welding or similar methods. It should be noted however, that the connection between the mounting bracket 44 and the frame 36 need not be rigid. For example, the mounting bracket 44 may be either rigidly or semi-rigidly connected to the frame 36 of the seat back 16 by any suitable permanent or detachable fastener now known or later invented, or by any suitable attachment structure such as a hook 250, 350 shown in FIGS. 17-18 or attachment projections 456, 458 shown in FIGS. 19-21 as described hereinafter.

The base portion 52 of the mounting bracket 44 is generally planar and is a thin, flange-like member. The pass-through aperture 54 may be substantially circular and extends through the flange-like structure defined by the base portion 52 centrally on the base portion 52. Thus, the pass-through aperture 54 is spaced from an outer periphery 56 of the base portion 52. The attachment portion 50 extends generally upward from the base portion 52. The attachment portion 50 may be contoured in correspondence to the shape of the frame 36 of the seat back 16 to facilitate connection of the attachment portion 50 with respect to the frame 36. For example, the attachment portion may be substantially arcuate in correspondence to the shape of the frame 36. The attachment portion 50 of the mounting bracket 44 may be connected to a rear side of the top portion 38 of the frame 36 adjacent to the rod sleeve 40. Furthermore, the attachment portion 50 may be opposite the rod sleeve 40, which may be attached to a front side of the top portion 38 of the frame 36.

Figure 9:
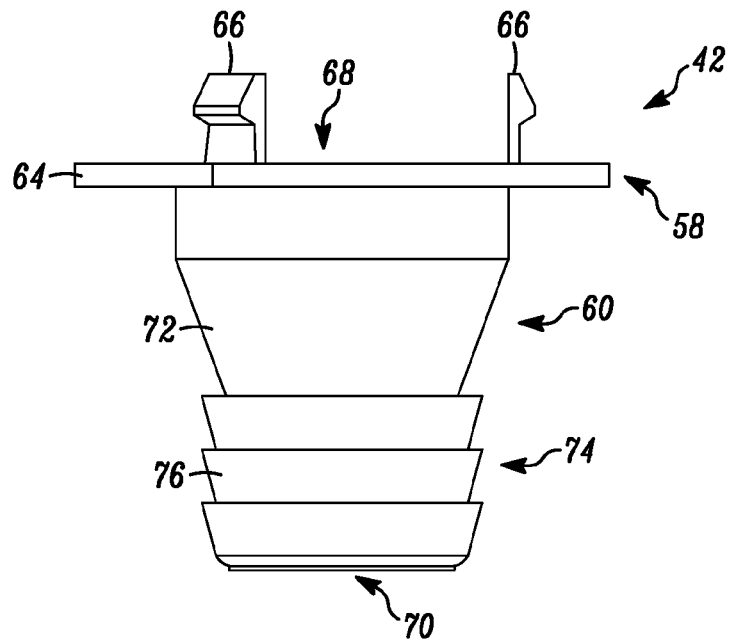
FIG. 9 is a side view showing the harness guide member according to the invention.
Figure 10:
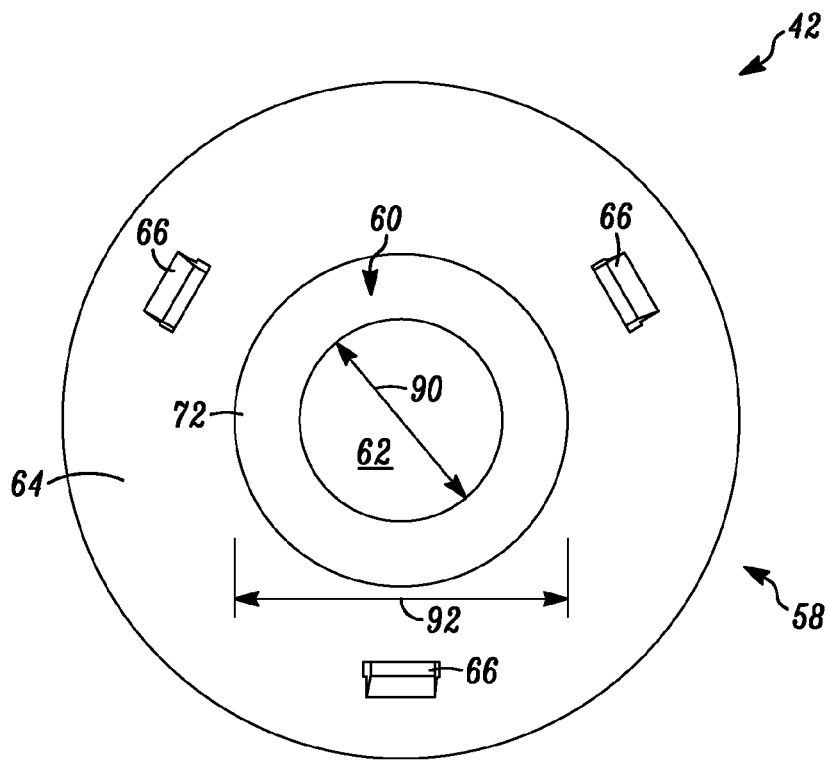
FIG. 10 is a top view showing the harness guide member according to the invention.

The harness guide member 42 includes an attachment portion 58 and a conduit portion 60, as shown in FIGS. 9-10. A first guide passage portion 62 is defined by the harness guide member 42 and extends through the attachment portion 58 and the conduit portion 60.

The attachment portion 58 of the harness guide member 42 includes an abutment flange 64 and a plurality of clips 66. The abutment flange 64 extends outward from and surrounds the first guide passage portion 62. The abutment flange may be a generally circular, substantially flat member that extends in a direction transverse to the first guide passage portion 62. However, other suitable geometries may be provided.

Figure 12:
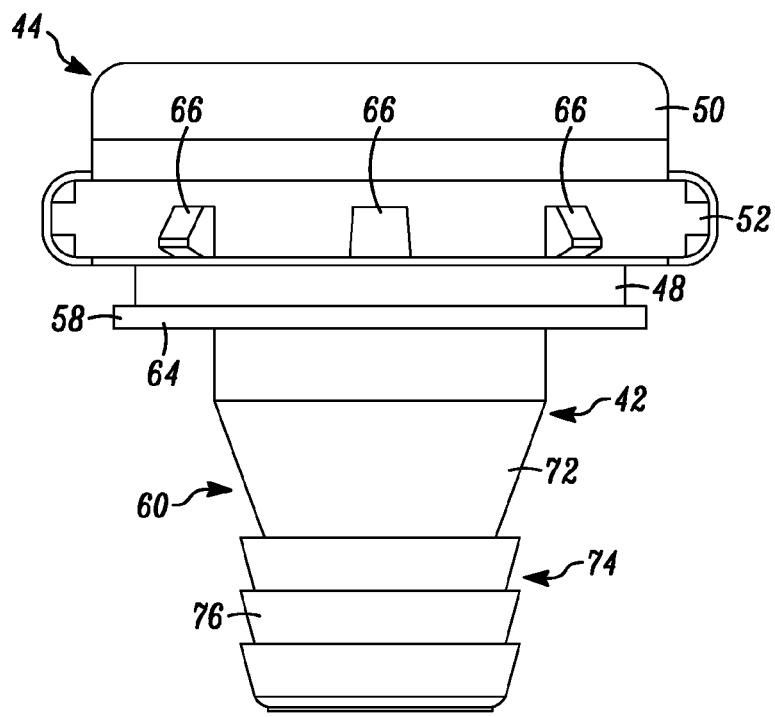
FIG. 12 is a front view of the mounting bracket and the harness guide member of the harness guide according to the invention.
Figure 13:
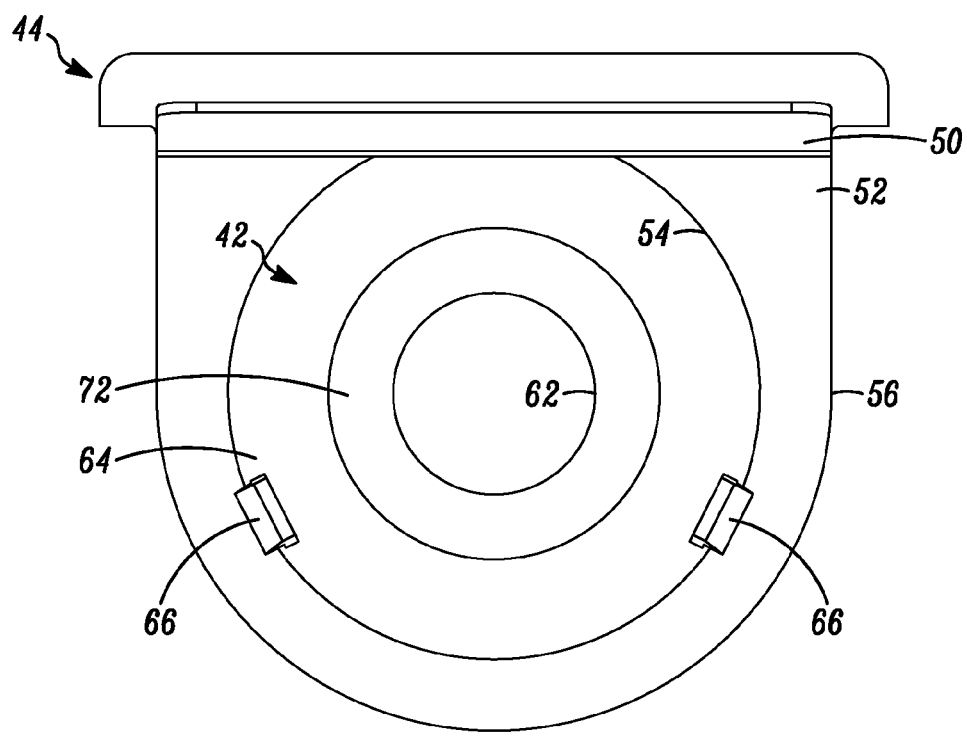
FIG. 13 is a top view of the mounting bracket and the harness guide member of the harness guide according to the invention.

The clips 66 of the attachment portion 58 are adapted to extend through the pass-through aperture 54 of the mounting bracket 44 and engage the base portion 52 of the mounting bracket 44. The clips 66 extend from the abutment flange 64 in a direction that is substantially aligned with the direction of the first guide passage portion 62. The clips 66 may be somewhat resilient members that are capable of compressing or deflecting slightly toward the first guide passage portion 62 upon engagement with the base portion 52 of the mounting bracket 44 within the pass-through aperture 54 thereof and then expanding or returning from their deflected position once they have passed through the pass-through aperture 54 in order to secure the harness guide member 42 with respect to the mounting bracket 44. Thus, when assembled with respect to the mounting bracket 44, the clips 66 extend through the pass-through aperture 54 of the mounting bracket 44 and are in engagement with the base portion 52 of the mounting bracket 44, as shown in FIGS. 12-13. The clips 66 are configured, however, to resist removal from the pass-through aperture 54 absent compression or deflection of the clips 66. It should be understood that although a plurality of clips 66 are shown and described herein, one of ordinary skill in the art would understand that any number of the clips 66 could be provided, as long as at least one clip 66 is provided for engagement with the mounting bracket 44. Depending on the number of the clips 66, the clips 66 may be spaced apart circumferentially around the first guide passage portion 62 of the harness guide member 42.

With further reference to FIGS. 9-10, the first guide passage portion 62 of the harness guide member 42 is defined in part by the conduit portion 60 of the harness guide member 42. The conduit portion 60 extends from a first open end 70 to a second open end 68. The second open end 68 is located adjacent to the abutment flange 64, while the first open end 70 is opposite the abutment flange 64.

The conduit portion 60 has a tapered shape, such that the width of the first guide passage portion 62 varies along the length of the conduit portion 60. In particular, the first open end 70 has a first width 90, and the second open end 68 has a second width 92 that is larger than the first width 90. To transition between the first width 90 and the second width 92, the conduit portion 60 includes a taper 72 that is disposed between the first open end 70 and the second open end 68. The second width 92 of the conduit portion 60 is smaller than a third width 94 that is defined by the pass-through aperture 54 of the mounting member 44. So that the headrest rod 28 may be received within the guide assembly 12, the first width 90, the second width 92 and the third width 94 are all larger than the width of the headrest rod 28 adjacent to the second open end 29 thereof.

In order to connect the conduit portion 60 of the harness guide member 42 to the guide tube 46, a retention portion 74 is formed on the exterior of the conduit portion 60 of the harness guide member 42. The retention portion 74 is located adjacent to the first open end 70 of the conduit portion 60 and may include any structure that is suitable to engage and retain the guide tube 46 with respect to the harness guide member 42. For example, the retention portion 74 may include a plurality of annular serrations 76 that encircle the conduit portion 60 and extend outward therefrom for engagement with the interior of the guide tube 46.

Referring back to FIGS. 2A-2B, the guide tube 46 is a conduit-like structure that extends from the harness guide member 42 to the exit aperture 24 of the seat back 16. The guide tube 46 may extend out of the exit aperture 24 or may terminate within the seat back 16. The guide tube 46 defines a second guide passage portion 78 that extends through the guide tube 46 for receiving the wire harness 30. The guide tube 46 extends from a first end 80 to a second end 82. The first end 80 of the guide tube 46 is attached to the harness guide member 42, such that the second guide passage portion 78 of the guide tube 46 is aligned with the first guide passage portion 62 of the harness guide member 42. Together, the first guide passage portion 62 and the second guide passage portion 78 define a guide passage 62, 78 through the harness guide assembly 12. The second end 82 of the guide tube 46 is disposed at the exit aperture 24 of the seat back 16. Thus, the second guide passage portion 78 of the guide tube 46 is defined from the first end 80 to the second end 82 for guiding the wire harness 30 through the guide tube 46 to the exit aperture 24.

Figure 11:
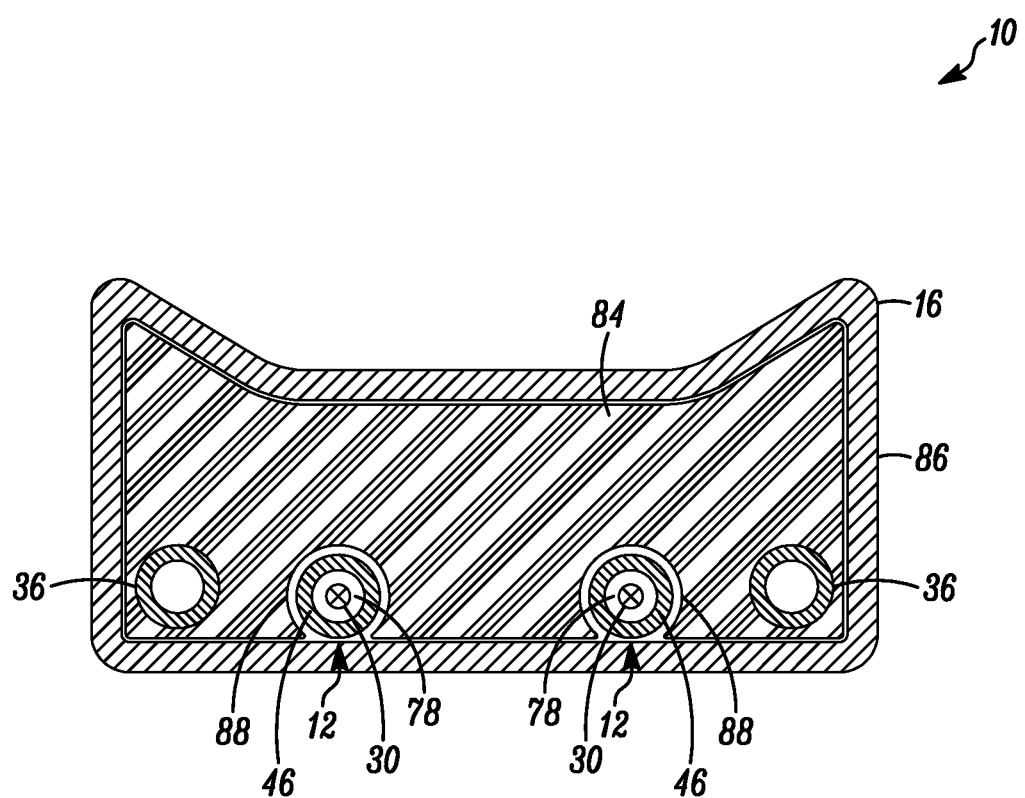
FIG. 11 is a sectional view of a seat back of the vehicle seat taken along the line 11-11 of FIG. 2B, showing the position of the guide assemblies with respect to a foam structure of the seat back.

As shown in FIG. 11, the seat back 16 includes a foam structure 84 that is supported by the frame 36 of the seat back 16. The foam structure 84 is adapted to support the weight of a passenger of the seat 10 and is retained within a seat cover 86 of the seat back 16. To provide clearance for the harness guide assembly 12, the foam structure 84 has a receiving portion 88 formed therein. The receiving portion 88 may be a trough, passageway, or other manner of cavity that is formed through the foam structure 84 of the seat back 16. The guide tube 46 is received within the receiving portion 88.

Figure 14A:
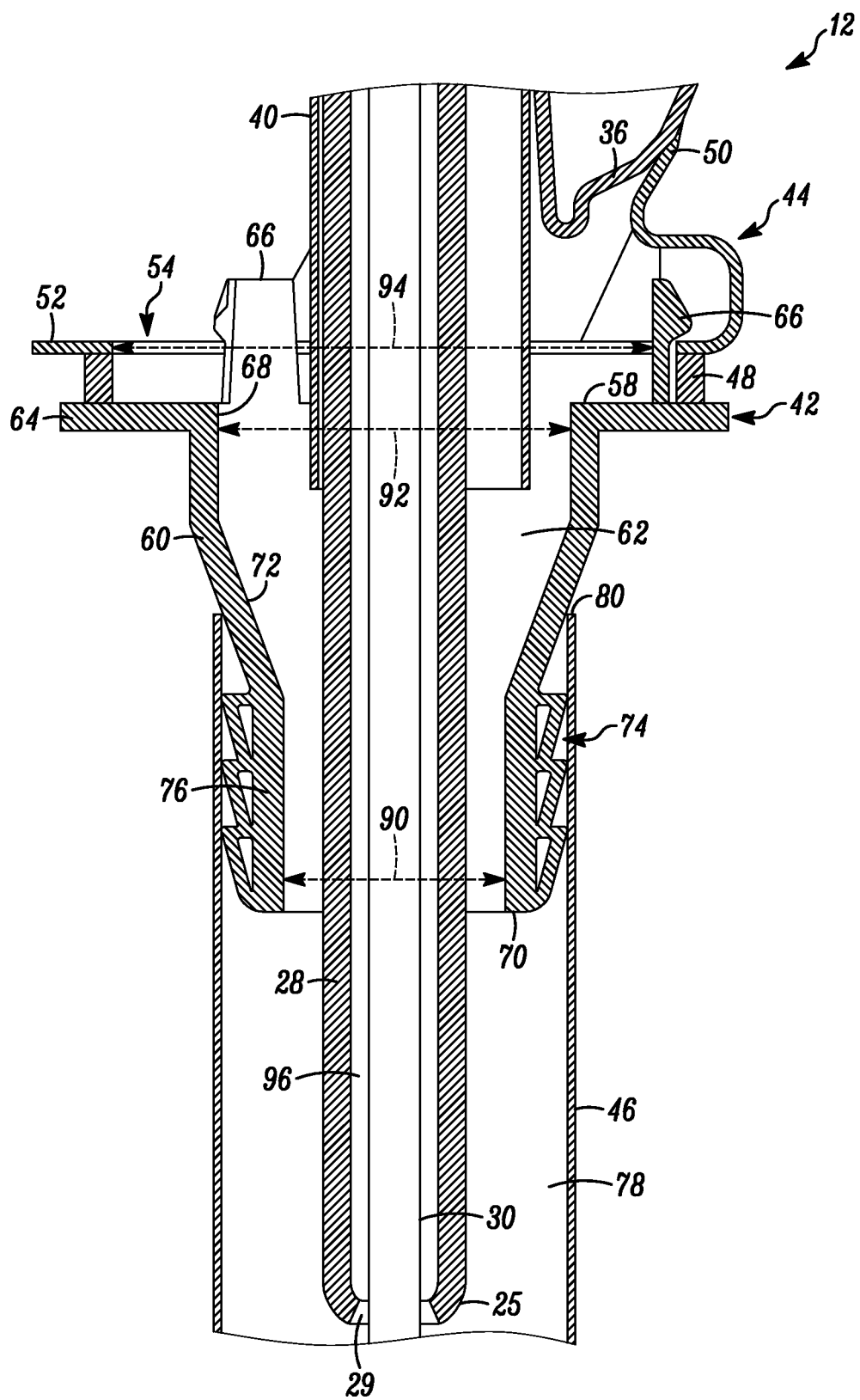
FIG. 14A is a cross-section view taken along the line 14A, 14B of FIG. 4, showing connection of the guide assembly to the frame of the vehicle seat, wherein the headrest is in the retracted position.
Figure 14B:
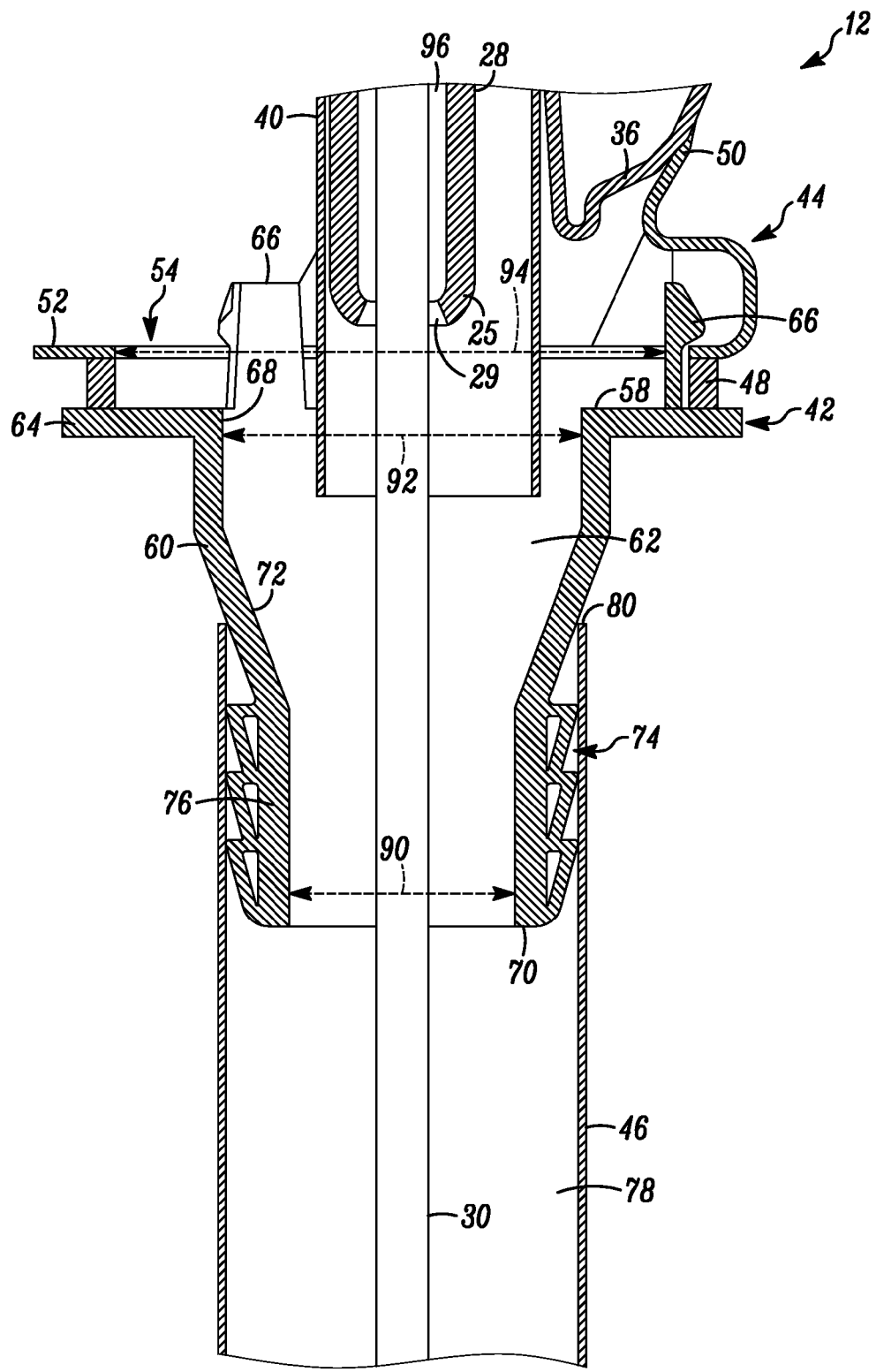
FIG. 14B is a cross-section view taken along the line 14A, 14B of FIG. 4, showing connection of the guide assembly to the frame of the vehicle seat, wherein the headrest is in the extended position.
Figure 15:
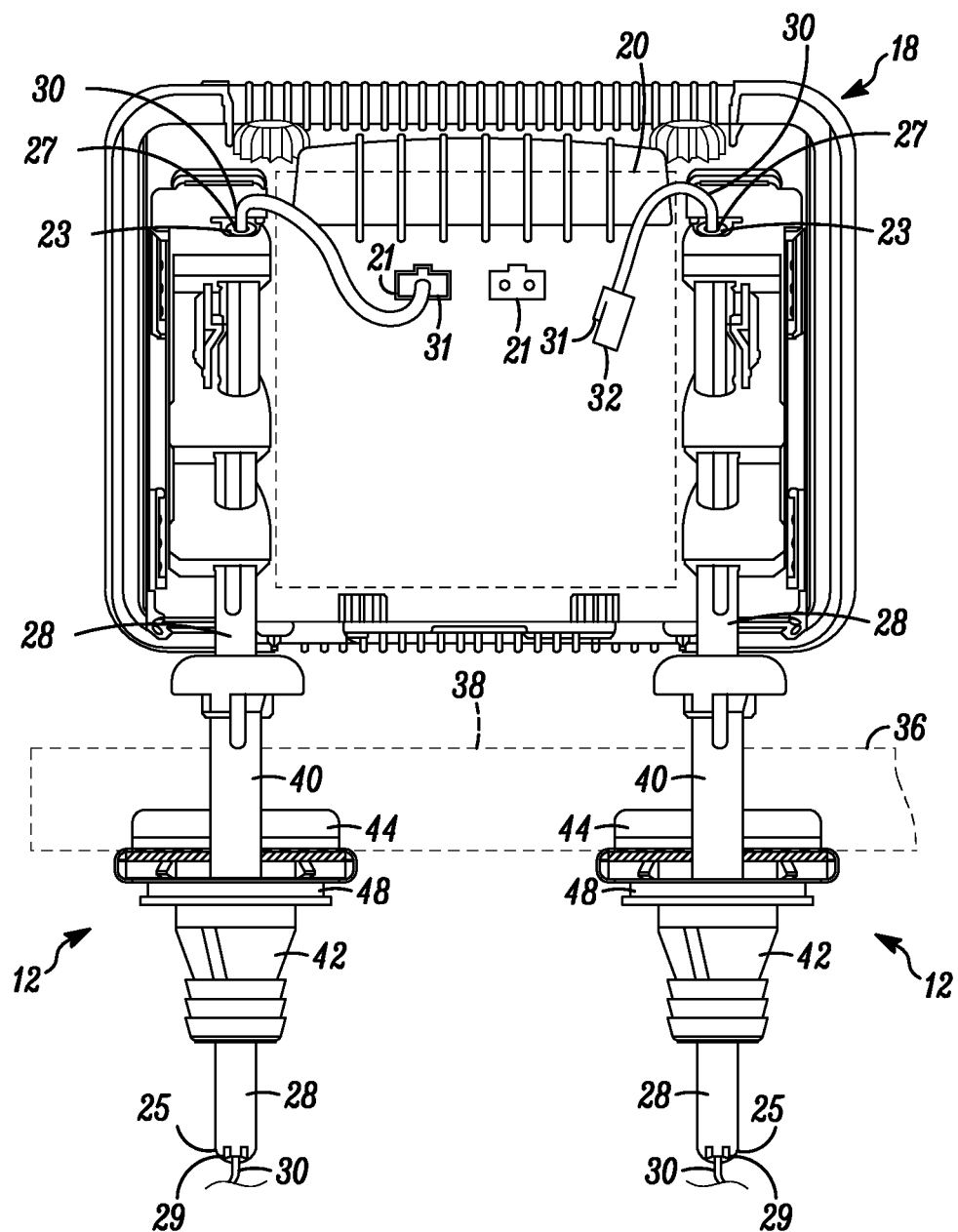
FIG. 15 is a front view showing the guide assembly and the interior of the headrest.

In use, the guide assembly 12 is connected to the vehicle seat 10 by connection of the mounting bracket 44 of the guide assembly 12 to the frame 36 of the seat back 16 of the vehicle seat 10, as shown in FIGS. 14A, 14B, and 15. The harness guide member 42 of the guide assembly 12 is connected to the mounting bracket 44 by engagement of the clips 66 of the harness guide member 42 with the base portion 52, thereby bringing the abutment flange 64 of the harness guide member 42 into engagement with the base portion 52 of the mounting bracket 44 either directly, or indirectly via the gasket 48. The guide tube 46 is connected to the harness guide member 42 by engagement with the retention portion 74. The headrest 18 is connected to the seat back 16 such that the headrest rod 28 extends through the mounting bracket 44, the harness guide member 42, and may also extend into the guide tube 46 when the headrest is in the retracted position. The headrest 18 is, however, moveable by movement of the headrest rod 28 relative to the rod sleeve 40 for positioning the headrest 18 with respect to the seat back 16 between the retracted position and the extended position. Thus, in the extended position, the headrest rod 28 may be located above the harness guide member 42 (FIG. 14B), while at least a portion of the headrest rod 28 may extend into the guide tube 46 of the harness guide assembly 12 when the headrest 18 is in the retracted position (FIG. 14A). Wire harness 30 is receivable within an internal passageway 96 of the headrest rod 28, which is in alignment with the second guide passage portion 78 of the guide tube 46, as well as the first guide passage portion 62 of the harness guide member 42. In this manner, the wire harness 30 may be routed through the headrest rod 28 and through the seat 10 using the harness guide assembly 12. Furthermore, the wire harness 30 may be installed subsequent to initial assembly of the seat 10 using the harness guide assembly 12, or the wire harness 30 may be easily replaced using the harness guide assembly 12.

Figure 16:
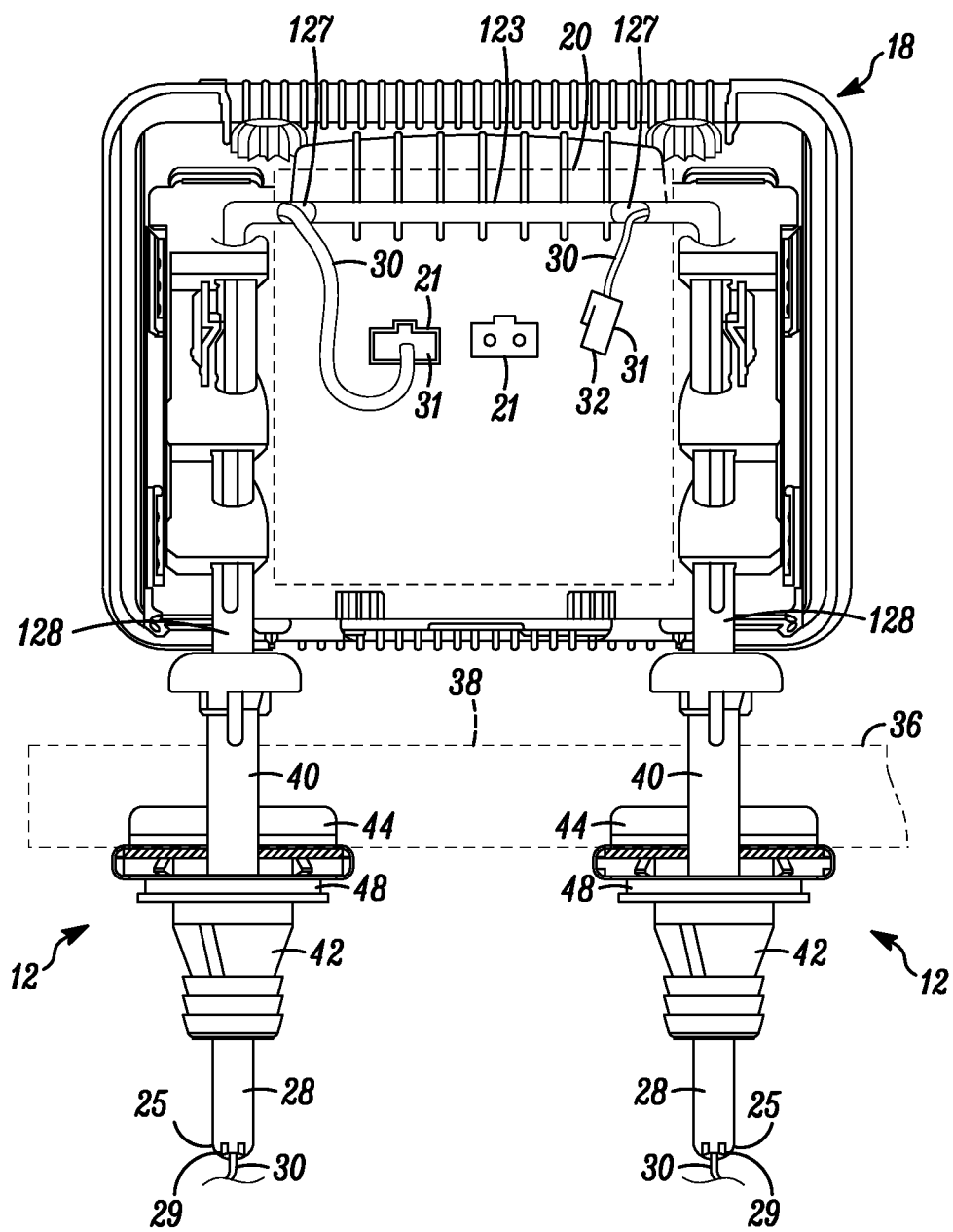
FIG. 16 is a front view showing the guide assembly and the interior of the headrest, including a one-piece headrest rod according to an alternative embodiment.

Although the headrest 18 has been shown and described herein as being supported by a pair of headrest rods 28, it should be understood that the invention is not limited to such a configuration. In particular, the headrest 18 could be supported by a single headrest rod 28. As a further alternative, as shown in FIG. 16, the headrest 18 could be supported with respect to the seat back 16 by a one-piece headrest rod 128 having a substantially U-shaped configuration within the headrest 18. So that the wire harness 30 may exit the one-piece headrest rod 128, one or more first openings 127 are positioned at an upper portion 123 of the one-piece headrest rod 128 that extends laterally across the headrest 18.

Figure 17:
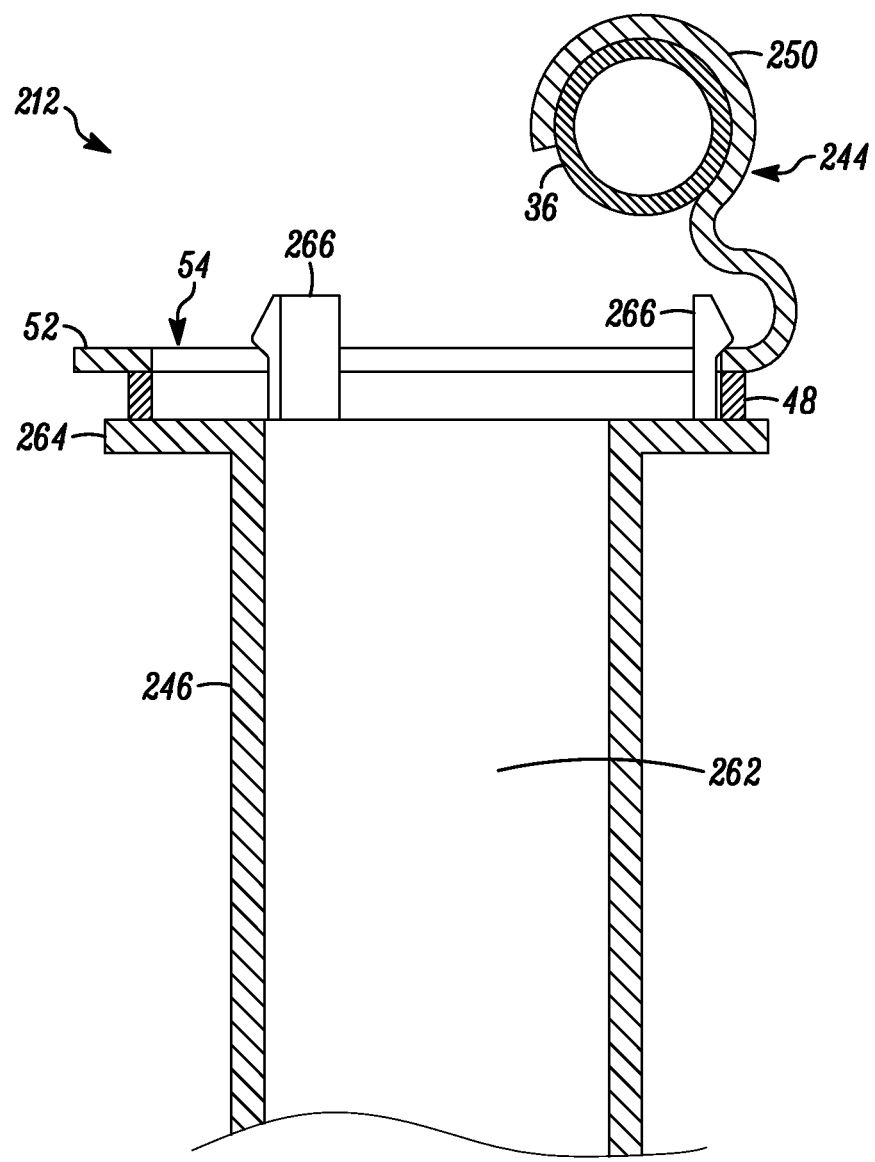
FIG. 17 is a cross-section view showing a harness guide assembly according to a first alternative embodiment, wherein a guide tube of the harness guide assembly has an integral attachment portion shown installed with respect to the frame of the vehicle seat.

Although the harness guide assembly 12 has been described previously as including a harness guide member 42, a mounting bracket 44, and a guide tube 46 as separate components, it should be understood that two or more of these components could be combined with each other to simplify the structure. For example, a guide assembly 212 according to a first alternative embodiment includes a guide tube 246 that defines a guide passage 262, an integral abutment flange 264, and integral clips 266, as shown in FIG. 17. The integral abutment flange 264 and the integral clips 266 are analogous in structure and function to the abutment flange 64 and the clips 66 that were previously described, with the distinction that they are formed as an integral portion of the guide tube 246. In addition, a mounting portion 244 may be provided including a resilient hook 250 that is adapted to connect to the frame 36 by a snap fit or a friction fit to allow connection of the mounting portion 244 to the frame 36 without welding.

Figure 18:
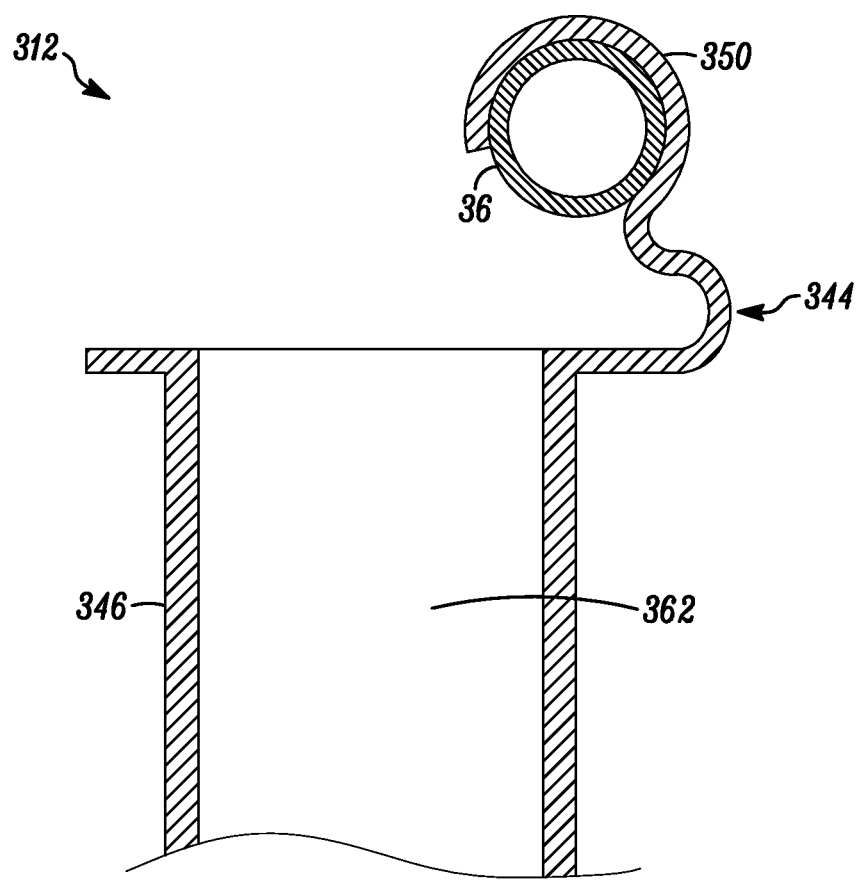
FIG. 18 is a cross-section view showing a harness guide assembly according to a second alternative embodiment, wherein the harness guide assembly includes a guide tube having an integral mounting bracket shown installed with respect to the frame of the vehicle seat.

As second alternative embodiment, a guide assembly 312 shown in FIG. 18 includes a guide tube 346 that defines a guide passage 362 and is formed integrally with a mounting portion 344 having an a resilient hook 350 for connection to the frame 36 of the seat back 16 by a snap fit or a friction fit.

Figure 19:
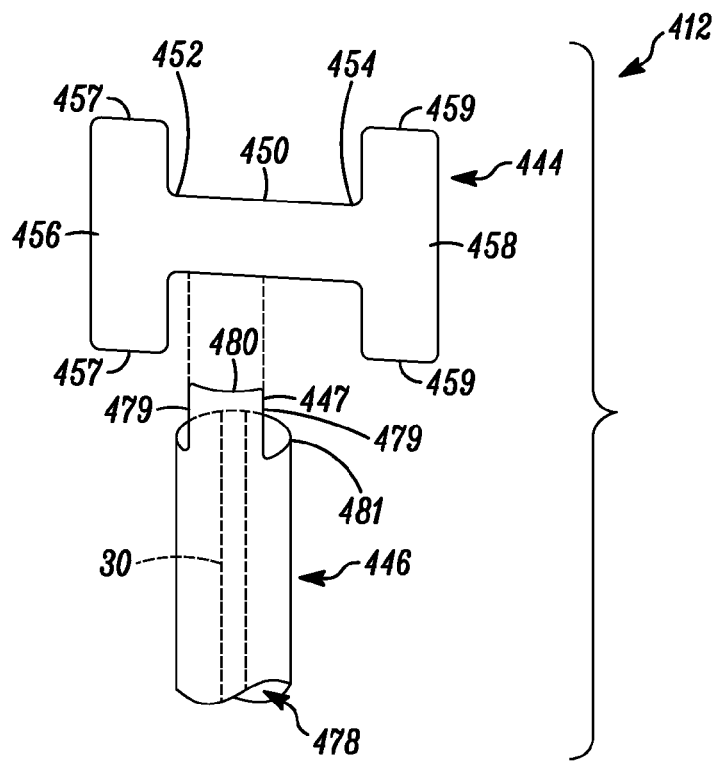
FIG. 19 is an exploded perspective view showing a headrest wire harness routing guide assembly according to a third alternative embodiment.
Figure 20:
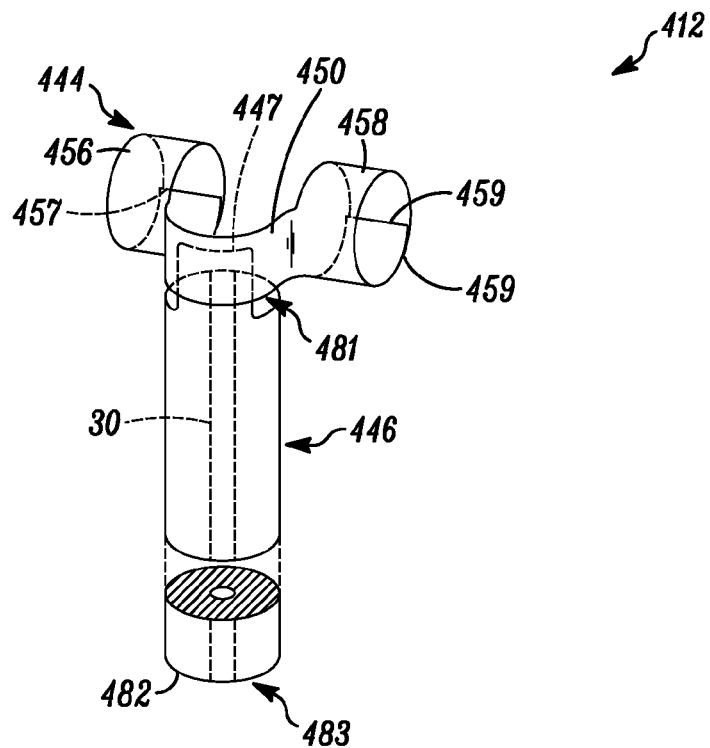
FIG. 20 is a perspective view showing the headrest wire harness routing guide assembly according to the third alternative embodiment.
Figure 21:
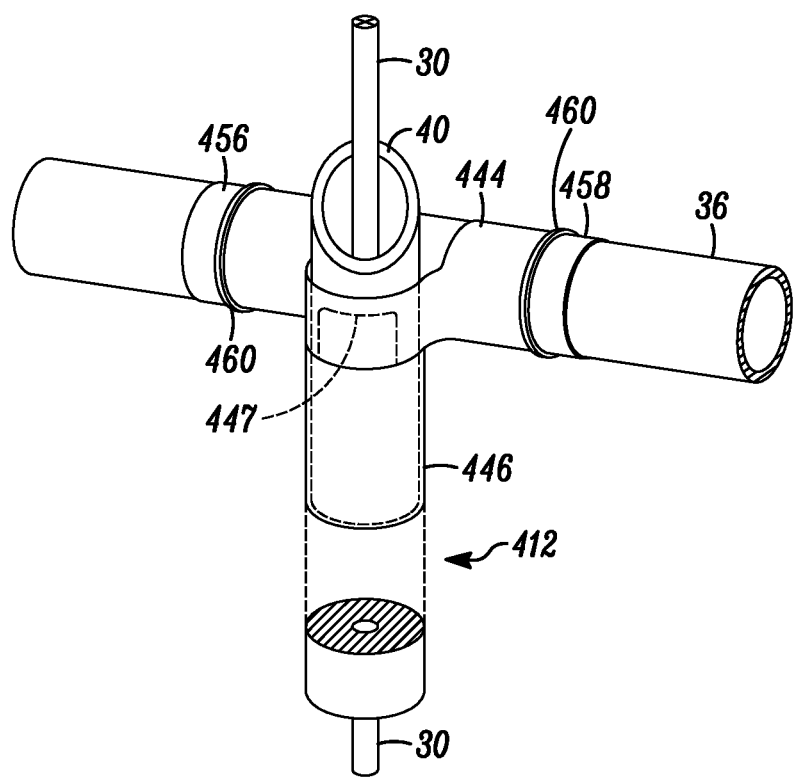
FIG. 21 is a perspective view showing the headrest wire harness routing guide assembly according to the third alternative embodiment installed with respect to the frame of the vehicle seat.

In a third alternative embodiment, a guide assembly 412 includes a guide tube 446 and an attachment member 444, as shown in FIGS. 19-21. The attachment member 444 is connected to the guide tube 446 and is also connected to or connectable to the upper portion 38 of the frame 36 of the seat back 16 of the vehicle seat 10 (FIG. 1) for supporting the guide tube 446 with respect to the seat back 16 of the vehicle seat 10.

The guide tube 446 is similar to the guide tube 46, as previously described, and includes a first end 480 and a second end 482 that is spaced apart from the first end 480. The guide tube 446 defines a first opening 481 at or near the first end 480, and defines a second opening 483 at or near the second end 482. A guide passage 478 extends through the guide tube 446 from the first opening 481 to the second opening 483. Thus, the wire harness 30 enters the guide passage 478 of the guide tube 446 at the first opening 481 and exits the guide passage of the guide tube 446 at the second opening 483.

The guide tube 446 may include an attachment projection 447 that extends from the guide tube 446 at the first end 480 thereof. The attachment projection 447 may be a unitarily formed portion of the guide tube 446 that extends part of the guide tube 446 past the first opening 481. The attachment projection may be characterized by provision of less than a complete, continuous structure that defines an interior, as is the case with the guide passage 478 between the first opening 481 and the second opening 483. Thus, the attachment projection 447 may be a tab having sides 479 that extend axially from the first opening 481 of the guide tube 446, and are spaced apart from one another. If the guide tube 446 is circular in cross-section, the attachment projection 447 may extend along an arc of less than 180 degrees, and preferably, 80-120 degrees.

The attachment member 444 is configured to connect the guide tube 446 to the seat back 16. A thin flexible material may be used to fabricate the attachment member 444, thereby allowing the attachment member to conform to the shape of the guide tube 446 and the frame 36. For example, one or more portions of the attachment member may be configured to wrap around the frame 36. In particular, the illustrated embodiment of the attachment member 444 is generally H-shaped, including a base portion 450 that extends from a first lateral side 452 to a second lateral side 454. A first attachment portion 456 having ends 457 is positioned at the first lateral side 452 of the base portion 450, and a second attachment portion 458 having ends 459 is positioned at the second lateral side 454 of the base portion 450. Each of the first attachment portion 456 and the second attachment portion 458 extends transverse to the base portion 450, thereby allowing the attachment portions 456, 458 to be wrapped around the frame 36 of the seat back 16. When the attachment portions 456, 458 are wrapped around the frame 36, the ends 457 of the first attachment portion 456 may overlap each other and the ends 459 of the second attachment portion 458 may overlap each other.

The attachment member 444 is connected to the guide tube 446 by connection of the attachment projection 447 of the guide tube 446 to the base portion 450 of the attachment member 444. This connection may be accomplished using an adhesive, a mechanical fastener, and hook and loop fastener, stitching, or any other connecting means now known or later invented that is suitable to secure the attachment projection 447 of the guide tube 446 with respect to the base portion 450 of the attachment member 444. Also, it should be understood that the attachment member 444 and the guide tube 446 could be formed as a single unitary structure, wherein the base portion 450 extends integrally outward from the sides 479 of the attachment projection 447, or the attachment projection 447 replaces the base portion 450 completely, such that the first attachment portion 456 and the second attachment portion 458 are extend integrally from the attachment projection 447 at the sides 479 thereof.

In order to connect the attachment member 444 to the frame 36 of the seat back 16, the attachment portions 456, 458 are wrapped around the frame 36, and then secured thereto using a securing member 460, such as a cable tie, a strap, an adhesive strip, a spring clip, wire or other suitable structure that is positioned on the exterior of the attachment portions 456, 458 and holds them in engagement with the frame 36. Alternatively, connecting means could be provided to secure the attachment portions 456, 458 to the frame 36 without wrapping or compression, for example, adhesives, hooks or hook-and-loop fasteners, or other suitable connecting means now known or later invented.

When the attachment member 444 and the guide tube 446 are installed with respect to the frame 36, the attachment projection 447 of the guide tube 446 is positioned adjacent to or in contact with either of the rod sleeve 40 or the frame 36, and the guide passage 478 is aligned with the rod sleeve 40. Furthermore, the rod sleeve 40 may extend into the guide passage 478. Thus, as similarly described in connection with previous embodiments, the second end 25 of the headrest rod 28 (not shown in FIGS. 19-21) can be positioned below the first opening 481 of the guide tube 446, and thus within the guide passage 478, when the headrest 18 is in the retracted position, and the second end 25 of the headrest rod 28 can be positioned above the first opening 481 of the guide tube 446 when the headrest 18 is in the extended position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle seating assembly, comprising:
   a seat back having a top end, a bottom end, and an exit aperture that is located at the bottom end of the seat back;
   a guide tube having a first end defining a first opening, a second end that is spaced apart from the first end, the second end defining a second opening, and a guide passage that extends through the guide tube from the first opening to the second opening for guiding a wire harness therethrough; and
   an attachment member that is connected to the seat back for supporting the guide tube with respect to the seat back, wherein the first end of the guide tube is connected to the attachment member and the guide tube extends downward from the attachment member to the exit aperture of the seat back.

2. The vehicle seating assembly of claim 1, wherein the seat back includes a seat frame member that is located at the top end of the seat back, the attachment member is attached to the seat frame member of the seat back, and the attachment member supports the guide tube such that the second opening of the guide tube is positioned adjacent to the exit aperture of the seat back.

3. The vehicle seating assembly of claim 1, wherein at least a portion of the attachment member extends into the first end of the guide tube and is in engagement with the guide tube for connecting the first end of the guide tube to the attachment member.

4. The vehicle seating assembly of claim 1, wherein the attachment member includes a base portion that is connected to the guide tube, a first attachment portion located at a first side of the base portion, and a second attachment portion located at a second side of the base portion.

5. The vehicle seating assembly of claim 4, wherein the attachment portions of the attachment member are each configured to wrap around a seat frame member of the seat back.

6. The vehicle seating assembly of claim 4, wherein the guide tube includes an attachment projection that extends outward from the guide tube at the first end thereof, wherein the attachment projection is connected to the base portion of the attachment member.

7. The vehicle seating assembly of claim 1, wherein the attachment member includes an attachment flange that is rigidly connectable to a seat frame member of the seat back.

8. The vehicle seating assembly of claim 1, wherein the attachment member is a hook that is connectable to a seat frame member of the seat back.

9. The vehicle seating assembly of claim 1, wherein the attachment member and the guide tube define a unitary body.

10. The vehicle seating assembly of claim 1, wherein the attachment member is a mounting bracket that is coupled to the guide tube.

11. The vehicle seating assembly of claim 10, further comprising:
    a harness guide member that is directly coupled to the mounting bracket and having a retention portion, wherein the guide tube is coupled to the harness guide member via engagement with the retention portion.

12. A vehicle seat assembly, comprising:
    a frame member;
    a seat back that is supported by the frame member, the seat back having a top end, a bottom end, and an exit aperture that is located at the bottom end of the seat back;
    a headrest;
    an electrical component that is disposed within the headrest;
    a headrest rod that supports the headrest with respect to the seat back, wherein a first end of the headrest rod is disposed within the headrest, and a second end of the headrest rod is disposed outside the headrest and is receivable within the seat back at the top end of the seat back;
    a harness guide including a guide tube and an attachment member that is connected to the guide tube and to the seat back, the guide tube having a first end defining a first opening, a second end that is spaced apart from the first end and is positioned proximate to the exit aperture of the seat back, the second end defining a second opening, and a guide passage that extends through the guide tube from the first opening to the second opening; and
    a wire harness that is connected to the electrical component, wherein the wire harness enters the headrest rod at a location that is proximate to the first end of the headrest rod, exits the headrest rod at a location that is proximate to the second end of the headrest rod, and extends through the guide passage of the guide tube to the exit aperture of the seat back.

13. The vehicle seat assembly of claim 12, wherein the guide tube is connected to the frame member of the seat back of the vehicle seat and the first end of the guide tube is positioned proximate to the frame member.

14. The vehicle seat assembly of claim 13, wherein the seat back includes a foam structure having a guide tube receiving portion formed therein, and the guide tube is received within the guide tube receiving portion of the foam structure.

15. The vehicle seat assembly of claim 13, wherein the attachment member is coupled to the frame member of the seat back.

16. The vehicle seat assembly of claim 15, wherein the seat back includes a sleeve that is attached to the frame member, and the headrest rod is received in the sleeve for relative movement of the headrest rod with respect to the frame member between an extended position and a retracted position, wherein the second end of the headrest rod extends into the guide passage when the headrest is in the retracted position.

17. The vehicle seat assembly of claim 15, wherein the attachment member is a mounting bracket that is coupled to the guide tube.

18. The vehicle seat assembly of claim 17, further comprising:
a harness guide member that is directly coupled to the mounting bracket and having a retention portion, wherein the guide tube is coupled to the harness guide member via engagement with the retention portion.

19. The vehicle seat assembly of claim 15, wherein the attachment member includes a base portion and an attachment portion that extends from the base portion.

20. The vehicle seat assembly of claim 19, wherein the attachment portion and the guide tube define a unitary body.

21. The vehicle seat assembly of claim 19, wherein the attachment portion includes an attachment flange that is rigidly connectable to the frame member of the seat back.

22. The vehicle seat assembly of claim 19, wherein the attachment portion is a hook.

23. The vehicle seat assembly of claim 19, wherein the attachment member includes a first attachment portion that is connected to a first side of the base portion and a second attachment portion that is connected to a second side of the base portion, wherein the first and second attachment portions are configured to wrap around the frame member of the seat back.

24. The vehicle seat assembly of claim 19, wherein the guide tube includes an attachment projection that extends outward from the guide tube adjacent to the first end thereof and is attached to the base portion.

25. A vehicle seat assembly, comprising:
a frame member;
a sleeve that is attached to the frame member;
a seat back that is supported by the frame member;
a headrest;
an electrical component that is disposed within the headrest;
a headrest rod that is disposed within the sleeve and supports the headrest with respect to the seat back for movement between an extended position and a retracted position;
a harness guide including a guide tube and an attachment member that is connected to the guide tube and to the seat back, the guide tube defining a guide passage that extends through the guide tube from a first end of the guide tube to a second end of the guide tube, wherein the sleeve is attached to a first side of the frame member, and the attachment member is attached to a second side of the frame member that is opposite the first side; and
a wire harness that is connected to the electrical component, wherein the wire harness extends through the headrest rod and extends through the guide passage of the guide tube.

* * * * *